UNITED STATES PATENT OFFICE.

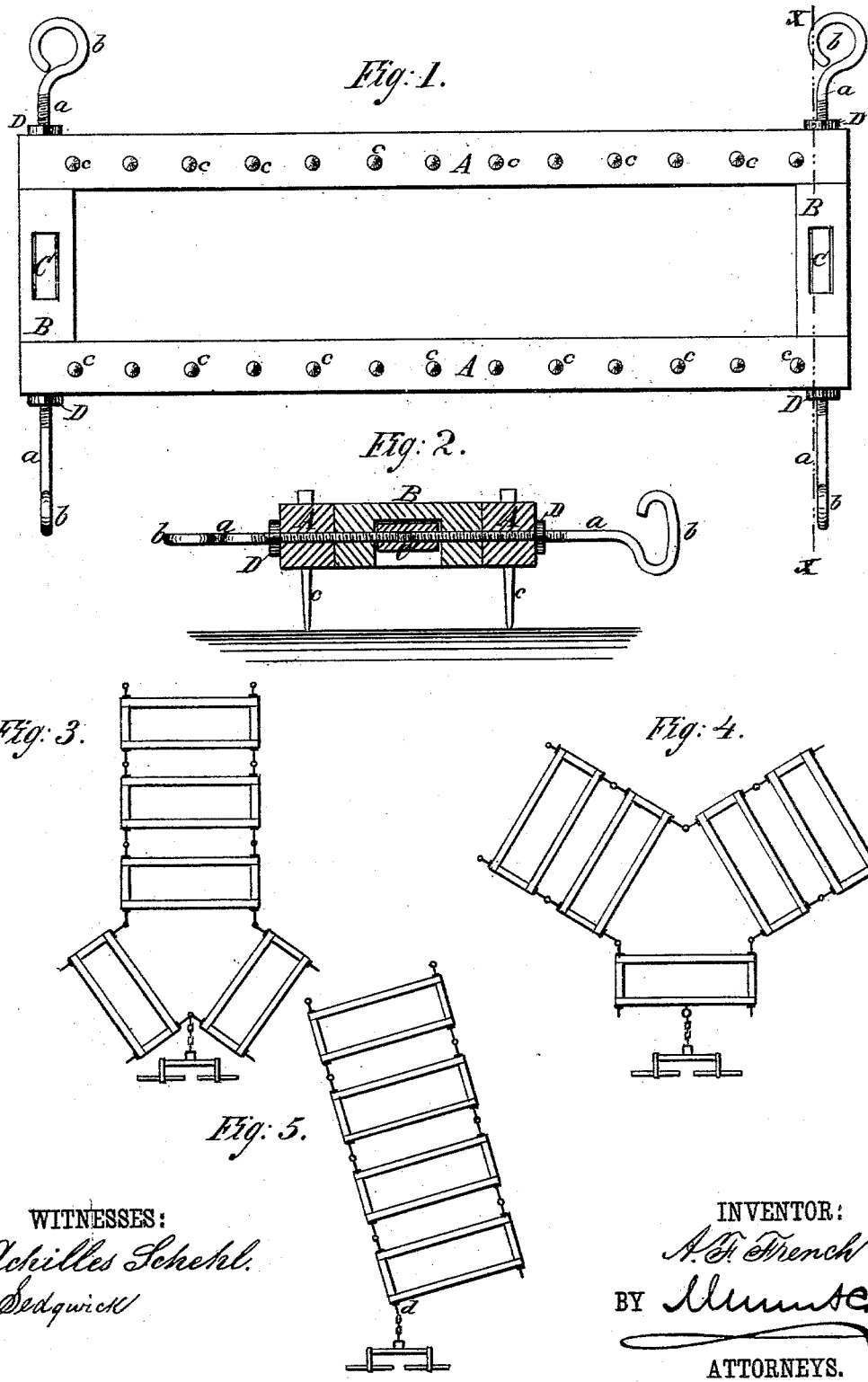

AARON F. FRENCH, OF DENISON, IOWA, ASSIGNOR TO HIMSELF AND EDWIN K. BURCH, OF SAME PLACE.

IMPROVEMENT IN HARROWS.

Specification forming part of Letters Patent No. 210,682, dated December 10, 1878; application filed November 5, 1878.

*To all whom it may concern:*

Be it known that I, AARON F. FRENCH, of Denison, in the county of Crawford and State of Iowa, have invented a new and Improved Harrow, of which the following is a specification:

The object of this invention is to strengthen the construction of the harrow, and to arrange it so that several sections can be connected together in different positions to adapt it to different purposes.

It consists in fastening the frame of the harrow together by iron rods passed transversely into the ends and screwed into nuts or burrs let into the end beams. These rods serve also as draft-bars, to which the whiffletrees are hooked, saving by their peculiar arrangement the frame of the harrow from strain.

In the accompanying drawings, Figure 1 is a plan of my improvement. Fig. 2 is a section of the same on line $x\,x$, Fig. 1; and Figs. 3, 4, and 5 show various ways of arranging the harrows to adapt them to different purposes.

Similar letters of reference indicate corresponding parts.

Referring to the drawings, A A are the side bars of the harrow-frame, and B B are the end bars. The bars B B are applied to the bars A A at the ends thereof, so as to give a flush connection, and secured in place by screw-threaded rods $a\,a$, passed through the side bars transversely, and thence lengthwise into ends B B, and engage a nut or burr, C, placed in a mortise in the bars B.

Nuts D are placed on each rod, and when it is screwed in as far as it should go the nuts D are screwed up against the side bars, holding them firmly against the end bars B. In this way a perfectly-secure connection is made between the different parts of the harrow-frame; and as the rods are designed to serve as draft-rods, being provided on their outer ends with hooks $b$, to which to attach the whiffletree, it will be readily understood that the strain or force of the draft, instead of being expended upon one side of the frame and upon the joints on that side, is applied to the nut on the shaft opposite to where the whiffletree is hooked, bearing against the side bar on that side, and thus the joints of the frame are relieved from strain.

Ordinary iron teeth $c\,c$, &c., are passed through the side bars B B.

The harrow shown in Fig. 1 is complete in itself; but in practice this is used simply as a section, several sections of this kind being hooked together in different relations to adapt them to particular purposes.

In Fig. 5 four sections are shown hooked together to form an ordinary drag for smoothing plowed ground, and the ordinary purposes for which harrows are used. The sections are connected together in parallel lines, and the whiffletree is attached to one corner, as at $d$, so that the lines of teeth are diagonal to the direction in which the harrow moves. Thus a broader space than the length of each section is subjected to the action of the harrow, and, the lines or rows of teeth intersecting, the ground is completely pulverized and smoothed down.

In Fig. 3 is shown an arrangement for rough ground with stubble upon it. Three sections are placed parallel to each other, and to one and two others are attached, so as to form an isosceles triangle. These two form wings extending from the middle of the sweep of the parallel sections beyond the same. Thus the stubble and hard clods are moved out of the way on either side, while the parallel sections in the rear smooth and level the ground. A chain is attached to the hooks at the apex of the triangle, and to this chain the whiffletree is hooked.

In Fig. 4 is shown an arrangement for harrowing young corn. Here two sections are hooked together parallel, then two other sections are prepared in the same way, and the two parts thus formed are connected together at adjacent corners to form the sides of a triangle. One other section is now applied to these sides to form the base of the triangle, and to the outside of the latter the whiffletree is attached.

By this arrangement a great deal of surface is covered, adapting it peculiarly to the cultivation of corn just before and after sprouting through the ground, as it does not harrow very closely, and four rows are covered and included in the harrowing.

Having thus described my invention, I claim as new and desire to secure by Letters Patent—

As an improvement in harrows, the side bars A A, connected with the ends B B by screw-threaded rods passed transversely through the side, and engaging nuts or burrs C, mortised in the bars B, and nuts D, screwed against the sides of the bars A, substantially as described.

AARON F. FRENCH.

Witnesses:
M. S. SAYRE,
W. J. WOOD.